United States Patent
Bonte et al.

(10) Patent No.: US 10,645,880 B2
(45) Date of Patent: May 12, 2020

(54) AGRICULTURAL BALER WITH FLYWHEEL BRAKE CONTROL

(71) Applicant: CNH Industrial America LLC, New Holland, PA (US)

(72) Inventors: Xavier G. J. M. Bonte, Et Sint Kruis (NL); Stefan De Rycke, Olsene-Zulte (BE); Frederik Demon, Bruges (BE); Robrecht M. K. Dumarey, Gistel (BE); Pieter Vandevelde, Sint Michiels Brugge (BE)

(73) Assignee: CNH Industrial America LLC, New Holland, PA (US)

( * ) Notice: Subject to any disclaimer, the term of this patent is extended or adjusted under 35 U.S.C. 154(b) by 449 days.

(21) Appl. No.: 14/769,239

(22) PCT Filed: Feb. 18, 2014

(86) PCT No.: PCT/EP2014/053073
§ 371 (c)(1),
(2) Date: Aug. 20, 2015

(87) PCT Pub. No.: WO2014/128100
PCT Pub. Date: Aug. 28, 2014

(65) Prior Publication Data
US 2016/0000012 A1     Jan. 7, 2016

(30) Foreign Application Priority Data
Feb. 21, 2013 (BE) .................................. 2013/0119

(51) Int. Cl.
*A01F 15/04* (2006.01)
*A01F 15/08* (2006.01)
*A01D 69/10* (2006.01)
*G05B 15/02* (2006.01)

(52) U.S. Cl.
CPC ............ *A01F 15/042* (2013.01); *A01D 69/10* (2013.01); *A01F 15/08* (2013.01); *A01F 15/0841* (2013.01); *G05B 15/02* (2013.01)

(58) Field of Classification Search
CPC ........ G05B 15/02; A01D 69/10; A01F 15/042
See application file for complete search history.

(56) References Cited

U.S. PATENT DOCUMENTS

| 6,161,368 A | 12/2000 | Wilkens et al. |
| 7,464,526 B2 | 12/2008 | Coenen |
| 8,417,426 B2 | 4/2013 | Vermeulen |
| 2004/0007054 A1* | 1/2004 | Makino ................. G01M 15/06 73/114.27 |

(Continued)

FOREIGN PATENT DOCUMENTS

EP    1974601 A1    10/2008

*Primary Examiner* — Santosh R Poudel
(74) *Attorney, Agent, or Firm* — Peter Zacharias; Patrick Sheldrake

(57) ABSTRACT

An agricultural baler has a shaft, a flywheel connected to the shaft, a plunger connected to the flywheel via a crank, a brake system adapted for providing a brake force for decelerating the flywheel, at least one sensor for providing sensor data indicative for at least one moving part of the baler, and a brake control system comprising a processing system, e.g. a processor provided with an algorithm for stopping the crank in a predefined launch position range, based on a mathematical model.

16 Claims, 11 Drawing Sheets

(56) References Cited

U.S. PATENT DOCUMENTS

| | | | |
|---|---|---|---|
| 2004/0149247 A1* | 8/2004 | Kataoka | F02N 11/006 123/179.4 |
| 2004/0255904 A1* | 12/2004 | Izawa | B60K 6/445 123/352 |
| 2005/0056165 A1* | 3/2005 | Roth | A01F 15/042 100/179 |
| 2008/0066706 A1* | 3/2008 | Nakamura | F02D 41/042 123/179.4 |
| 2010/0167879 A1* | 7/2010 | Chu | A63B 22/001 482/52 |
| 2012/0103294 A1* | 5/2012 | Kitano | F02N 11/0814 123/179.25 |
| 2012/0204742 A1 | 8/2012 | Van Vooren et al. | |
| 2013/0179055 A1* | 7/2013 | Kato | B60K 6/48 701/113 |
| 2014/0305322 A1* | 10/2014 | Galant | A01F 15/04 100/35 |

* cited by examiner

AGRICULTURAL BALER WITH FLYWHEEL BRAKE CONTROL

This application is the US National Stage filing of International Application Serial No. PCT/EP2014/053073 filed on Feb. 18, 2014 which claims priority to Belgian Application BE2013/0119 filed Feb. 21, 2013, each of which is incorporated herein by reference in its entirety.

FIELD OF THE INVENTION

The invention relates to the field of agricultural balers for producing bales by compressing agricultural crop material. More specifically, the present invention relates to large balers with a heavy flywheel (e.g. 700 kg).

BACKGROUND OF THE INVENTION

The vast majority of balers does not have its own engine, but is towed by a tractor, and is powered by coupling the power take-off (PTO) shaft of the tractor to an input shaft of the baler. The baler further has a flywheel connected to the input shaft, and a gearbox that drives the various mechanisms in the baler to pick-up the crop from a field, to form the crop into bales and to wrap twine and/or foil around the bales.

A one-way clutch is typically arranged between the PTO shaft and the flywheel to allow the flywheel to rotate faster than the PTO shaft. The baler input shaft can be operatively decoupled from the tractor PTO, e.g. for transportation of the baler from one field to the other.

A large and heavy flywheel is required in a baler, especially in so called "large square balers", or "high density balers" to overcome peak loads encountered by the baler gearbox, which occurs e.g. when the plunger of the baler compresses the crop material in the bale chamber when forming the bales. By using a flywheel with a high inertia and running at a high speed (e.g. 1000 rpm), peak energy for the peak loads can be delivered by the flywheel, which slightly slows down during each compression, and which is accelerated again by the tractor PTO between two compressions. However, the high inertia of the flywheel creates a problem when starting the baler. The PTO shaft when driven by the tractor engine at the speed at which it needs to turn to drive the baler during normal operation, may not be able to provide the high torque needed to bring the flywheel up to its steady speed (e.g. 1000 rpm). As a result, when the baler is hitched to the tractor and its flywheel is connected to the tractor PTO shaft, the tractor engine may stall or a safety mechanism may declutch the PTO from the tractor engine on account of the high load on the PTO shaft when the baler is started.

A solution to this problem proposed in EP1974601 is to use a hydraulic motor to supplement the torque provided by the PTO shaft when starting the baler flywheel. This solution is not entirely satisfactory because it requires a powerful hydraulic motor, with a power comparable to that of the tractor PTO.

Another solution to this problem is disclosed in WO2011060995, where a tractor with a change speed gearbox is described, which allows the baler to start-up in two phases. In the first phase the flywheel is accelerated to a first speed using a first transmission ratio of the change speed gearbox, and in the second phase the flywheel is accelerated to a second speed using a second transmission ratio of the change speed gearbox. A disadvantage of this technique is that it requires a tractor with a change speed gearbox.

SUMMARY OF THE INVENTION

It is an object of embodiments of the present invention to provide a baler with good start-up behavior, and a method for good start-up of that baler.

It is also an object of embodiments of the present invention to provide a tractor and baler combination, with a good start-up behavior.

The above objective is accomplished by a method and device according to embodiments of the present invention.

In a first aspect, the present invention provides an agricultural baler comprising a shaft for coupling with a power take-off, and a flywheel connected to the shaft; a plunger connected to the flywheel via a crank, the plunger being adapted for performing a reciprocal movement between a near position allowing crop material to be added in a bale chamber and a distal position suitable for compressing crop material in the bale chamber; a brake system adapted for providing a brake force for decelerating the flywheel depending on a brake control signal; at least one sensor for providing sensor data indicative for at least one moving part of the baler; and a brake control system connected to the at least one sensor for receiving the sensor data, and connected to the brake system for providing the brake control signal, the brake control system comprising a processing system provided with an algorithm for determining the brake control signal for stopping the crank in a predefined launch position range.

It is an advantage of such a baler that it is able to stop its crank in a suitable launch position, from which a subsequent start-up is guaranteed. This allows balers with a large and heavy flywheel to be used in combination with less powerful tractors than was possible in the past. Because stalling of the baler is avoided, using this baler is more efficient, faster, and safer.

In contrast to prior art solution, where an additional motor is used to solve a start-up problem, the solution of the present invention is based on a brake system, which may sound quite contradictory, and thus should come as a surprise.

By using the brake system of the present invention, such an additional (powerful) start-up motor can be avoided. In addition, the brake system can also be used for holding the moving parts of the baler still during transport, which is safer.

The processing system may e.g. be a programmable digital processor, e.g. a CPU or digital signal processor DSP, etc.

The baler may comprise one or more sensors. Different configurations are possible, such as e.g. a velocity sensor, an absolute or relative position sensor, a proximity sensor, and combinations thereof. The algorithm may depend on the sensor being used, and may be implemented in analog or digital circuitry, and may be based on continuous time, polling basis, or interrupt basis.

In case more than one sensor are present, at least two algorithms may be provided, only one of which is active. For example, one preferred algorithm is to be used as long as both function correctly, and a backup-algorithm to be used if one of the sensors is damaged.

The algorithm may be based on a mathematical model of at least part of the baler. The model may assumes that all kinetic energy of the moving parts of the baler is located in the crank, and that the crank passes in each rotation through a friction zone, and through a compression zone.

In an embodiment of the agricultural baler, the predetermined launch position range may be is a range of angular positions of the crank situated at an angular distance of at least 90° in forward direction from the position of the crank where the plunger reaches its distal position, preferably at least 120°, more preferably at least 150°, even more preferably at least 180°.

By stopping the crank in a predefined position, from which, at the next start-up, it can rotate over at least 90° (or 120° or more) before reaching its distal position (corresponding to the highest pressure), the flywheel (and other moving parts of the baler) can gain sufficient kinetic energy to "survive" the first compression. In this way, the risk of stalling the baler during start-up can be significantly reduced, or even completely eliminated.

Of course, by holding the moving parts of the baler in fixed position during transportation, the initial position of the baler when arriving at the next field is the same as the position in which the baler stopped on the previous field.

In an embodiment of the agricultural baler, the algorithm may be adapted for determining a start time for applying the brake force based on the sensor data.

Different algorithms are possible, however, in all of them, a suitable moment is determined for activating the brake system, such that the crank stops in the desired position range.

In an embodiment of the agricultural baler, the sensor data may be indicative for the crank velocity and the crank position, and the algorithm may be adapted for determining as the start time the time when the angular velocity has decreased below a threshold velocity, and the crank position has reached a threshold angle.

This may be implemented as a two-step process: first monitoring the angular velocity until it has dropped below a predefined threshold value (without having to look at the angular position), then determining the time instance when the crank is in or has passed a predefined angular position (without having to look at the angular velocity), or stated mathematically: first monitoring when ($\omega<\omega thr$), then monitoring when ($\theta>\theta thr$), and that is the moment to start braking.

In an embodiment of the agricultural baler, the at least one sensor may comprise a proximity sensor located at the threshold angle, and the processing system may be connected to a clock unit. The algorithm may be adapted for converting the sensor data into an angular velocity.

In this embodiment, a single proximity sensor may be used. The time is determined when the crank passes a predefined position (e.g. the position of the sensor). The (average) angular velocity (for the first step of the algorithm) can be determined based on the time difference between two time instances. The moment to start braking can be determined as the moment when the crank passes the predefined position, on the condition that the (average) velocity has dropped below a given value.

In an embodiment of the agricultural baler, the at least one sensor may comprise an absolute position sensor adapted for providing data indicative for the angular position of the crank, and the algorithm may be adapted for converting the sensor data into an angular velocity.

In this embodiment, a single absolute position sensor may be used. The velocity (required for the first step of the algorithm) can be derived as the time derivative of the absolute position. The absolute position itself can be used in the second step of the algorithm.

In an embodiment of the agricultural baler, the at least one sensor may comprise a relative position sensor adapted for providing data indicative for the relative angular position of the crank, and the algorithm may be adapted for converting the sensor data into an angular velocity. The algorithm may be adapted for determining a compression zone, and for assigning a time corresponding to an end of the compression zone to the start time.

In this embodiment, a single relative position sensor may be used. The velocity (required for the first step of the algorithm) can be derived as the time derivative of the relative position. Position information of the crank can be derived by monitoring the velocity, e.g. by checking the slope thereof, for detecting when the crank is in a so called "compression zone". A suitable moment may e.g. be shortly after the crank has passed the compression zone.

In an embodiment of the agricultural baler, the at least one sensor may comprise a velocity sensor adapted for providing data indicative for the angular velocity of the crank, and the algorithm may be adapted for determining a compression zone, and for assigning a time corresponding to an end of the compression zone to the start time.

In this embodiment, a single velocity sensor may be used. This is very similar to the previous embodiment, except that the velocity information is directly obtained from the sensor, thus the time derivative need not be calculated, which may be easier to implement, and may require less processing power.

In a second aspect, the present invention provides a method for stopping a crank of an agricultural baler in a predefined launch position range, the baler comprising a shaft, and a flywheel connected to the shaft; a plunger connected to the flywheel via a crank, the plunger being adapted for performing a reciprocal movement between a near position in which crop material may be added in a bale chamber and a distal position in which the added crop material is compressed in the bale chamber; a brake system adapted for providing a brake force for decelerating the flywheel depending on a brake control signal; at least one sensor for providing sensor data indicative for at least one moving part of the baler; a brake control system connected to the at least one sensor for receiving the sensor data, and connected to the brake system for providing the brake control signal, the brake control system comprising a processing system provided with an algorithm for providing the brake control signal for stopping the crank in a predefined launch position range. The method comprises the steps of: a) determining a start time based on the sensor data; b) applying the brake force at the determined start time.

By starting to brake at a suitable moment and with a suitable, e.g. predefined, constant force, it can be assured that the crank will stop in the suitable position range.

In an embodiment of the method, the sensor data is indicative for the crank velocity and the crank position, and step a) comprises determining as the start time the time when the angular velocity has decreased below a threshold velocity, and wherein the crank position is in or has passed a threshold angle.

In an embodiment of the method, the at least one sensor comprises a proximity sensor located at the threshold angle, and the processing system is connected to a clock unit; and step (a) of the method comprises the steps of: c) retrieving a time value from the clock unit; d) converting the sensor data into angular velocity.

In an embodiment, a programmable processor, e.g. a microcontroller or a digital signal processor (DSP) with an embedded timer unit may be used. Such processors are commercially available in different speed grades (clock frequency of the processor unit), and with different memory sizes (e.g. flash, EEPROM, RAM).

In an embodiment of the method, the at least one sensor comprises an absolute position sensor adapted for providing data indicative for the angular position of the crank, and step (a) of the method comprises the step of: c) converting the sensor data into angular velocity data.

For example, if the sensor data is absolute or relative position information, velocity data may be calculated as the time derivative of the sensor data. For example, if the sensor data is the time stamp when the crank passes a predefined location, then the (albeit average) angular velocity may be calculated on the basis of the time difference between two successive time stamps.

In an embodiment of the method, the at least one sensor comprises a relative position sensor adapted for providing data indicative for the relative angular position of the crank, and step (a) of the method comprises the steps of: c) converting the sensor data into angular velocity data, d) determining a compression zone in the angular velocity data; e) assigning a time corresponding to an end of the compression zone to the start time.

In an embodiment of the method, the at least one sensor comprises a velocity sensor adapted for providing data indicative for the angular velocity of the crank, and step (a) of the method comprises the step of: d) determining a compression zone in the angular velocity data; e) assigning a time corresponding to an end of the compression zone to the start time.

In a third aspect, the present invention provides a computer program product that, when executed on a processing system, provides instructions for executing any one of methods described above.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

BRIEF DESCRIPTION OF THE DRAWINGS

The invention will be further elucidated by means of the following figures.

FIG. 12(a) shows the angular crank velocity over time, FIG. 12(b) shows the angular position of the crank over time, FIG. 12(c) shows the braking force applied for stopping the crank in a predetermined launch position range.

FIG. 14(a) shows a calculated angular crank velocity, FIG. 14(b) shows the angular position of the crank over time, FIG. 14(c) shows the braking force applied for stopping the crank in a predetermined launch position range.

FIG. 15(a) shows the angular crank velocity, FIG. 15(b) shows the braking force applied for stopping the crank in a predetermined launch position range.

Figure 1:
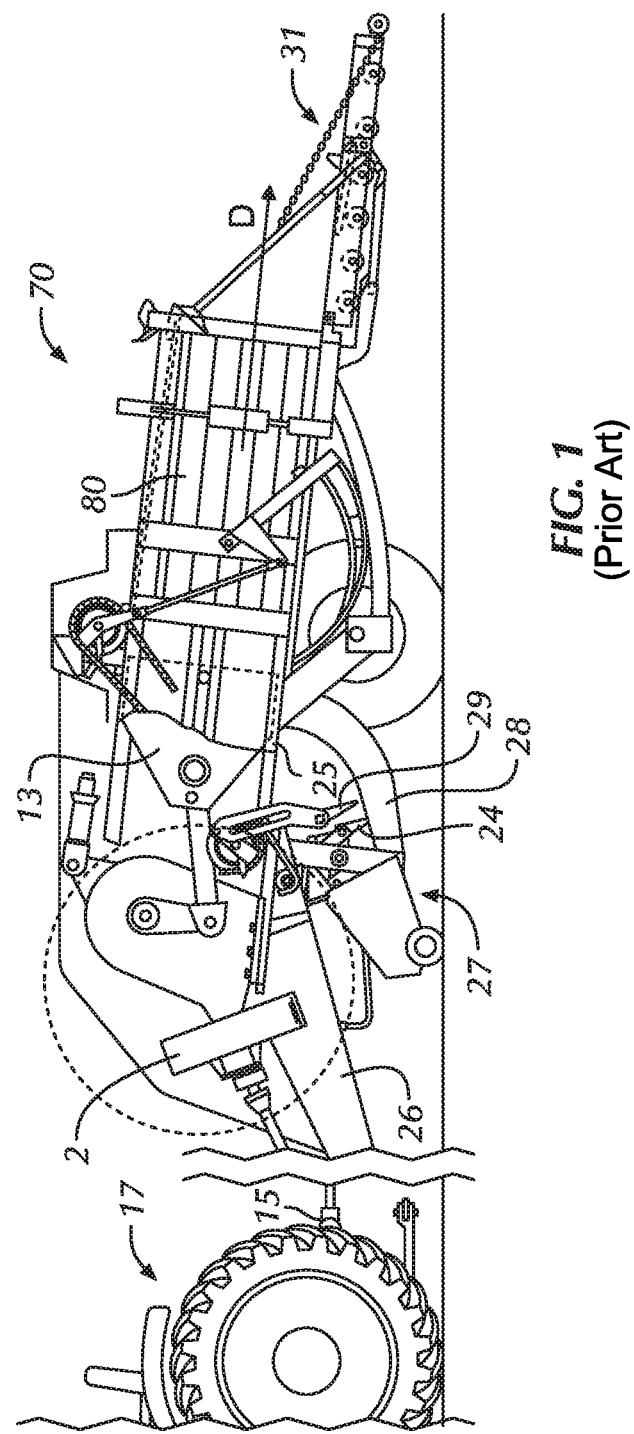
FIG. 1 is a side view of a classical tractor and a towable baler according to the prior art.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in embodiments of the present invention reference is made to "normal direction" or "forward direction" of the input shaft or the flywheel or the crank of the baler, the rotation direction of the flywheel during normal production of bales is referred to.

Where in embodiments of the present invention reference is made to "normal operation of the baler", the condition of the baler is meant wherein the flywheel is rotated for producing bales.

Where in embodiments of the present invention reference is made to "reverse direction" or "backward direction" of the input shaft or the flywheel or the crank of the baler, the rotation direction opposite to the normal direction is referred to.

Where in embodiments of the present invention reference is made to "plunger impact on the crop material", the moment in time at which the reaction force exerted upon the plunger by the compressed crop material is above a certain threshold value, e.g. above 25 kN, is referred to.

Where in embodiments of the present invention reference is made to "high density bales", reference is made to bales having a density higher than about 100 kg/m3, for example higher than 190 kg/m$^3$ are meant.

Where in embodiments of the present invention reference is made to "disc brake", reference is made to a device for slowing or stopping the rotation of a wheel while it is in motion. In this application reference is made to the caliper-type of disc brakes, as well as the drum-type of disc brakes. The caliper-type of disc brake comprises a brake disc and a caliper, the brake caliper comprising two brake pads to be forced to the sides of the disc.

Agricultural balers, of the type that can be towed and powered via a tractor PTO are known in the art. Referring to the drawings, FIG. 1 shows an example of an agricultural baler 70 comprising a frame 25 which is equipped with a forwardly extending tongue 26 at its front end with hitch means (not shown) for coupling the baler 70 to a towing tractor 17. A pick-up assembly 27 lifts windowed crop material off the field as the baler 70 is traveled thereover, e.g. while being pulled by a tractor, and delivers such material into the front end of a rearwardly and upwardly curved, charge-forming feeder duct 28. The duct 28 communicates at its upper end with an overhead, fore-and-aft extending bale chamber 80 into which crop charges are loaded by a cyclically operating stuffer mechanism 29. A continuously operating packer mechanism 24 at the lower front end of the feeder duct 28 continuously feeds and packs material into the duct 28 so as to cause charges of the crop material to take on and assume the internal configuration of the duct 28 prior to periodic engagement by the stuffer mechanism 29 and insertion up into the bale chamber 80. The packer mechanism 24 may be replaced by a rotor mechanism which will also continuously feed and pack material into the duct 28. The feeder duct 28 may be equipped with means (not illustrated) for establishing whether a complete charge has been formed therein and operating the stuffer mechanism 29 in response thereto. Each action of the stuffer mechanism 29 introduces a "charge" or "flake" of crop material from the duct 28 into the chamber 80.

A plunger 13 reciprocates in a fore-and-aft direction within the bale chamber 80, at least within a first part thereof. Biomass fed via the feeder duct 28 is thereby compacted, e.g. compressed or otherwise treated, so as to form bales in the above-described operation of the agricultural baler 70. Cuboid shaped bales, also known as "rectangular bales" are formed. The formed bales may then be moved forward by the reciprocating motion of the plunger 13 to shift serially and incrementally along the bale chamber 80 towards a discharge outlet, wherefrom the bales may eventually be ejected. The baler 70 may furthermore comprise components such as a knotter mechanism for automatically tying the completed bales with e.g. twine or similar lineal object to make them self-supporting, for example for shipping and storage. Once tied, the bales are discharged from the discharge outlet of the bale chamber 80 onto a discharge 31 in the form of a chute, generally designated 31, for gently lowering the bales near ground level.

Large balers 70, especially rectangular balers 70 for producing high-density bales have a flywheel 2 with a relatively large diameter (e.g. in the range of 75 to 130 cm, e.g. 110 cm) and heavy weight (e.g. in the range of 300 to 1000 kg, e.g. 700 kg) for obtaining a high inertial mass and energy equivalent. When all crop material of one field is compacted into bales, the baler 70 is temporarily stopped, e.g. by decoupling or disabling the tractor PTO so that the flywheel 2 will slow down until it stops, and the related functions, such as the pick-u and/or packer and/or stuffer mechanisms are deactivated along with the flywheel 2. The baler 70 is then brought to another field, usually while there is still some crop material left in the bale chamber 80. When arriving at the next field to be harvested, the baler 70 needs to be started up again, but it has been found, particularly with large balers 70 having a large and heavy flywheel 2, that problems may arise due to the high inertia of the flywheel 2, especially when there is still crop material left in the bale chamber 80, which can be the case, since balers 70 are not always emptied between different fields.

Figure 2:
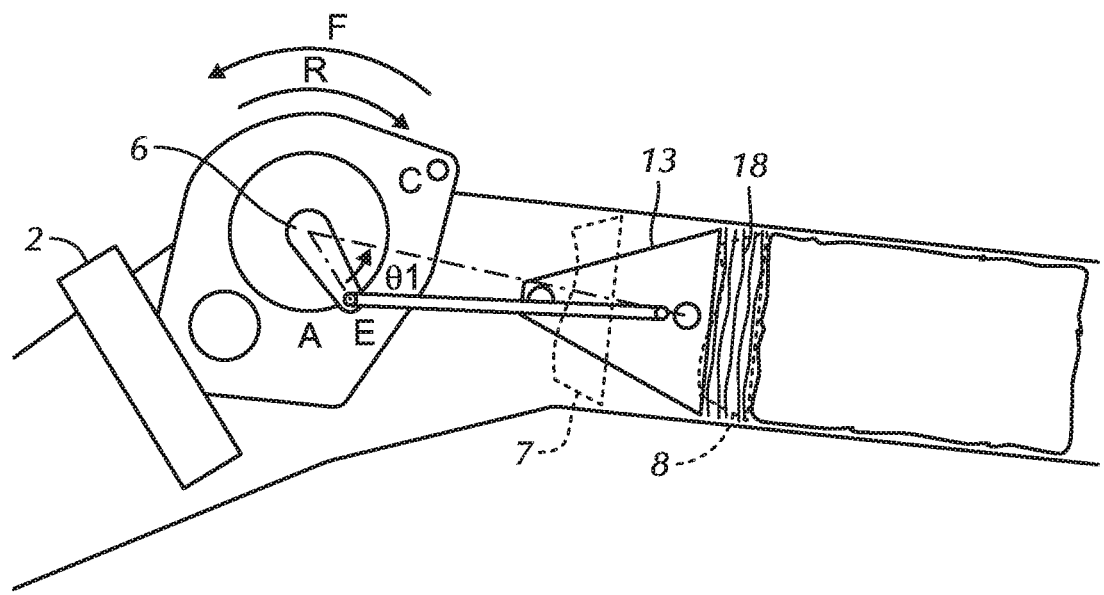
FIG. 2 is an enlarged view of part of the baler of FIG. 1, wherein the crank is in an unfavorable position E for start-up.

The inventors have found that the start-up problem occurs when the flywheel 2 does not "survive" the first plunger impact, i.e. when the plunger 13 stalls during the first compression of the crop material in the bale chamber 80, shortly after start-up and is not able to complete an entire first plunger cycle. An example of such a start-up position is illustrated in FIG. 2 showing the initial condition of the crank 6 and plunger 13 just before the baler 70 is started. In the example of FIG. 2, the crank 6 is located at an angular distance θ1 of approximately 45° with respect to the position which the crank 6 would assume when the plunger 13 is in its distal position 8 inside the bale chamber 80. When the baler 70 is started from this initial condition of the crank 6 and plunger 13, the flywheel 2 cannot gain sufficient speed and energy before the plunger 13 impacts or reaches the crop material 18, e.g. straw in the bale chamber 80, and the tractor engine stalls or the safety mechanism declutches the PTO 15 from the tractor engine, resulting in a start-up failure of the baler 70.

During the tests, the inventors also noted that, when switching-off the baler 70, and letting it slow-down freely, the flywheel 2 and crank 6 tended to automatically rotate to an unfavorable condition, e.g. close to crank position A or E in FIG. 2, corresponding to an angle θ1 of about 90° or about 45° respectively, because of the gravity force acting on the heavy crank-arms 6.

Figure 3:
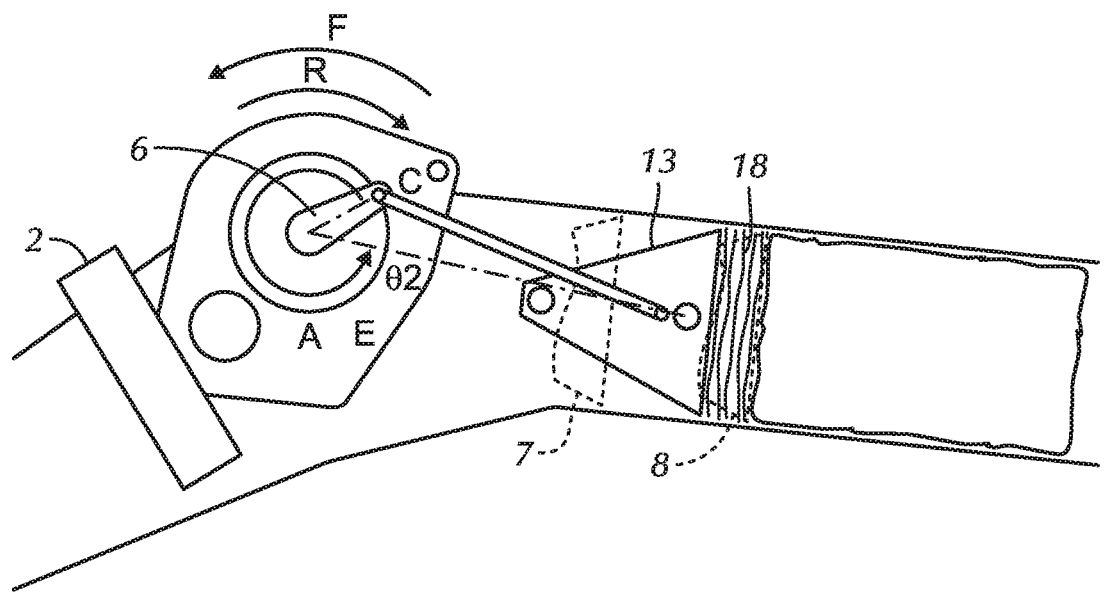
FIG. 3 is an enlarged view of part of the baler of FIG. 1, wherein the crank is in a favorable position C for start-up.

The inventors also found that, when the baler 70 was started from a favorable crank position, e.g. crank position C in FIG. 3, it was found that the start-up of the baler 70 never failed. In position C of FIG. 3, the crank 6 shows an angle θ2 at an angular distance of about 300° with respect to the position which the crank 6 will assume after rotating the flywheel 2 in forward direction F until the plunger 13 reaches its distal position 8 inside the bale chamber 80.

Figure 4:
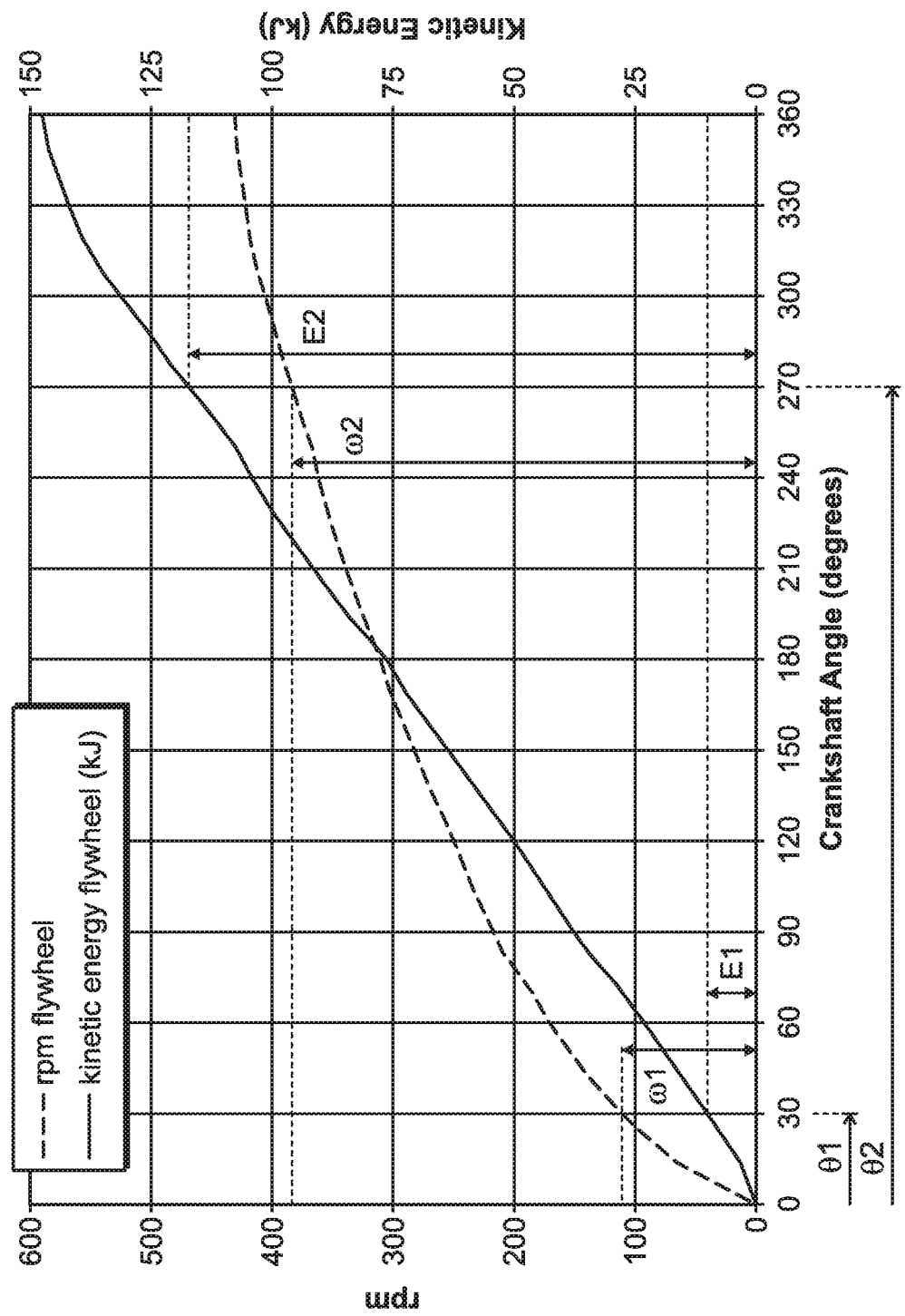
FIG. 4 shows an example of the rotational speed and corresponding kinetic energy of a flywheel of an empty baler at start-up.

This behavior was further investigated, and the start-up behavior of a flywheel 2 of a particular empty baler 70 and a particular tractor 17 combination, wherein the start-up sometimes failed, was measured, as shown in FIG. 4. The skilled person can easily make similar curves for other tractor 17 and baler 70 combinations, provided of course the tractor 17 has sufficient power to start-up the baler 70 under best-case conditions. In the particular case of FIG. 4, the empty baler 70 was started with its crank 6 in the position A, but another start-position could also be used, and the angular speed ω(t) of the flywheel 2 was measured, and plotted as shown in FIG. 4. On the horizontal axis the relative angular position θ of the crank 6 is shown with respect to its starting position. The angular velocity ω(t) of the flywheel 2 is shown on the left vertical axis, while the corresponding kinetic energy of the flywheel 2 is shown on the right vertical axis. Note that, due to the gearbox transmission ratio, the flywheel 2 rotates multiple times for each crank rotation. Only the first full revolution of the crank 6 after start-up is shown, which corresponds to a plurality of revolutions of the flywheel 2, e.g. a predefined number in the range from 18 to 28 revolutions. As can be seen from FIG. 4, after the crank 6 has rotated over 30°, the kinetic energy E1 of the flywheel 2 after start-up is about 10 kJ, and the angular velocity cal of the flywheel 2 is about 110 rpm. When the crank 6 has rotated over 270°, the kinetic energy E2 of the flywheel 2 is about 115 kJ, and the angular velocity ω2 of the flywheel 2 is about 380 rpm. The exact numbers are not important, but it is clear from this example that the more time the baler 70 has before the first impact, the larger the angular velocity. In the example shown in FIG. 4 the angular velocity ratio ω2/ω1 is about 380/110=3.45, but as kinetic energy (for a pure rotational movement) is proportional to the square of angular velocity, the kinetic energy ratio E2/E1 is about 115/10=11.5. This example shows that the kinetic energy of the flywheel 2 before the first impact of the plunger 13 into the crop material 18 inside the bale chamber 80 can be increased by a factor of 11.5 (more than ten), by starting from a favorable start-position (also called "launch position") such as e.g. crank position C in FIG. 3, as compared to starting from an unfavorable position, such as e.g. crank position A in FIG. 3. Note that the kinetic energy curve shown in FIG. 4, at least for the first revolution of the crank 6, is substantially monotonically increasing with the angle. Thus the larger the value of, the more kinetic energy the flywheel 2 will have before the "first impact", i.e. before the plunger 13 reaches its distal position 8 in the bale chamber 80.

The principle of the present invention is to provide a baler 70 wherein the flywheel 2 has gained sufficient kinetic energy before the first impact of the plunger 13 on the crop material 18 in the bale chamber 80, or, more accurately stated, since the amount of crop material 18 in the bale chamber may be a variable quantity and may even be absent, before the plunger 13 reaches its distal position 8 (see FIG. 3). This is obtained in the following way: instead of letting the flywheel 2 slow-down by itself at switch-off, in which case the crank 6 may stop in any position, a controlled braking force is applied to the flywheel 2, in such a manner that the flywheel 2 and crank 6 will stop in a predetermined (favorable) launch position range.

The predetermined launch position range is defined as a range of angular positions θ of the crank 6 situated at an angular distance of at least 90° and at most 360°, measured in forward direction F, from the position of the crank where the plunger 13 reaches its distal position 8, preferably at least 120°, preferably at least 150°, preferably at least 180°, preferably at least 210°, preferably at least 240°, preferably at least 270°, preferably at least 300°. The larger the angular distance position, the more energy the flywheel 2 will have before plunger impact.

By starting up the next time from this favorable launch position, the risk of start-up problems is reduced, or even completely eliminated, because, as shown above in FIG. 4, by the time when the plunger 13 reaches the crop material 18, the flywheel 2 will have gained sufficient kinetic energy to compress the crop material 18 and to continue rotating, in other words, it has "survived" the first impact). During the first compression, the flywheel 2 will lose part of its kinetic energy (e.g. in the order of 0 to 75 kJ, depending on the amount and the condition of the crop material 18 in the bale chamber 80), but thanks to the start from the predetermined launch position, a sufficient amount of kinetic energy will remain, despite the energy lost during the first compression, so that the flywheel 2 will continue rotating. The flywheel 2 will typically decelerate during the first compression until the moment when the plunger 13 has reached its distal position 8, and will then accelerate again to increase its kinetic energy for the next compression. As the crank 6 has almost a full revolution before the second compression, it will not only recover the energy lost during the first impact, but will accelerate further, etc, and continue accelerating during the next revolutions until the flywheel 2 has reached its nominal speed (e.g. 1000 rpm).

In order to stop the flywheel 2 and crank 6 in the predetermined launch position range, a brake system (e.g. a disc brake system 40) is added to the baler 70 for stopping the flywheel 2, and a brake control system 47 for applying a suitable braking force. The disc brake 40 may be activated in any known way, e.g. mechanically, hydraulically, pneumatically or electromagnetically.

In what follows, first an example of a flywheel brake system will be described, referring to FIG. 5 to FIG. 9. Then a mathematical model of the kinetic behavior of the baler 70 during switch-off will be described, and illustrated by FIG. 10 and FIG. 11. Finally some practical examples will be described, and illustrated by FIG. 12 to FIG. 16.

Figure 6:
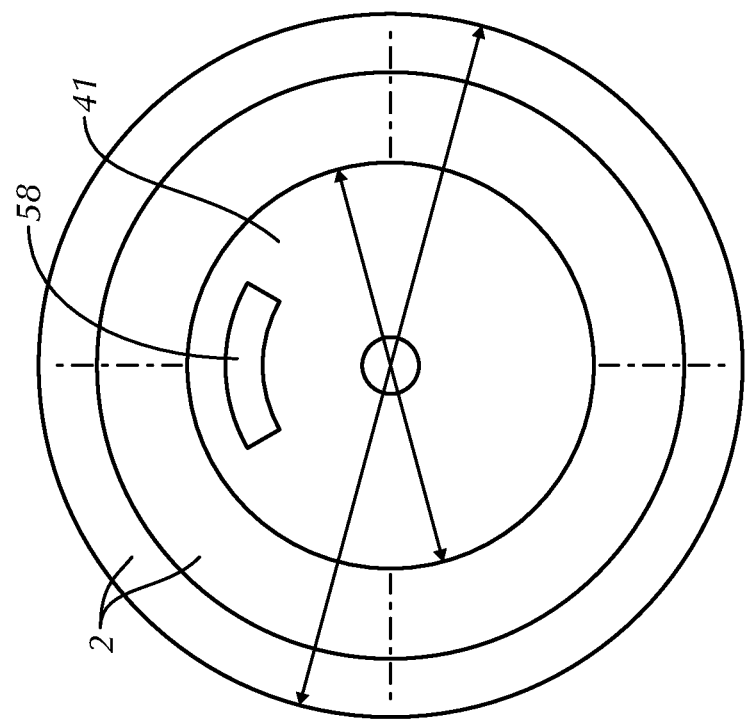
FIG. 6 is a front view of the flywheel and brake disc assembly of FIG. 5, further showing the position of a brake pad.
Figure 5:
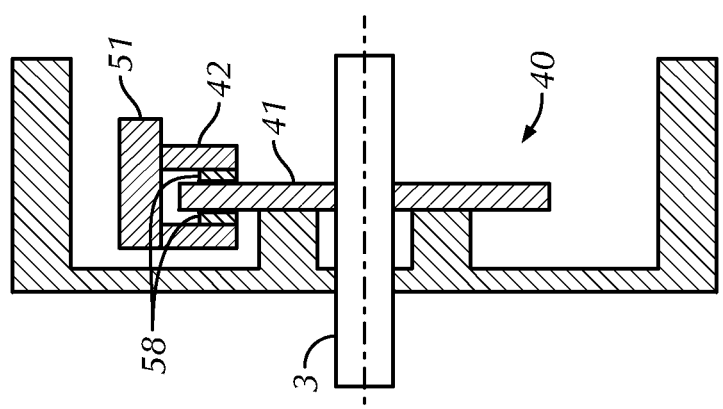
FIG. 5 is a schematic drawing of an embodiment of a flywheel and brake disc assembly, as may be used in a baler according to an embodiment of the present invention, shown in side view.
Figure 8:
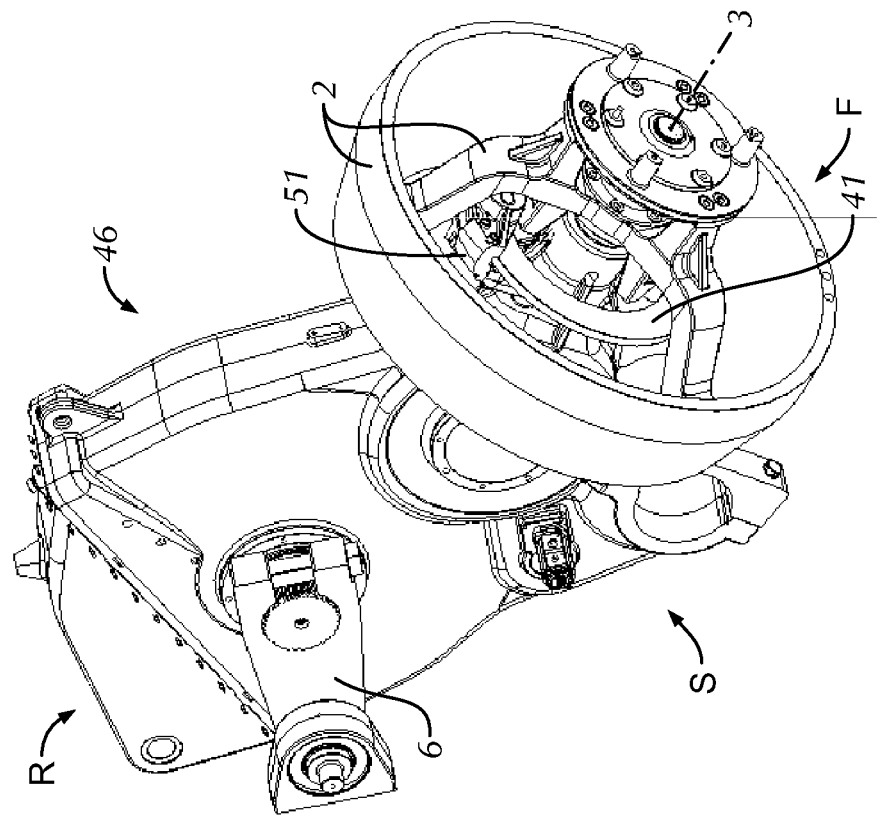
FIG. 7 and FIG. 8 are an isometric view of an embodiment of a gearbox assembly comprising a gearbox and a flywheel mounted on an input shaft of the gearbox, and a brake disc mounted to the flywheel, and a brake caliper mounted to the gearbox.
Figure 7:
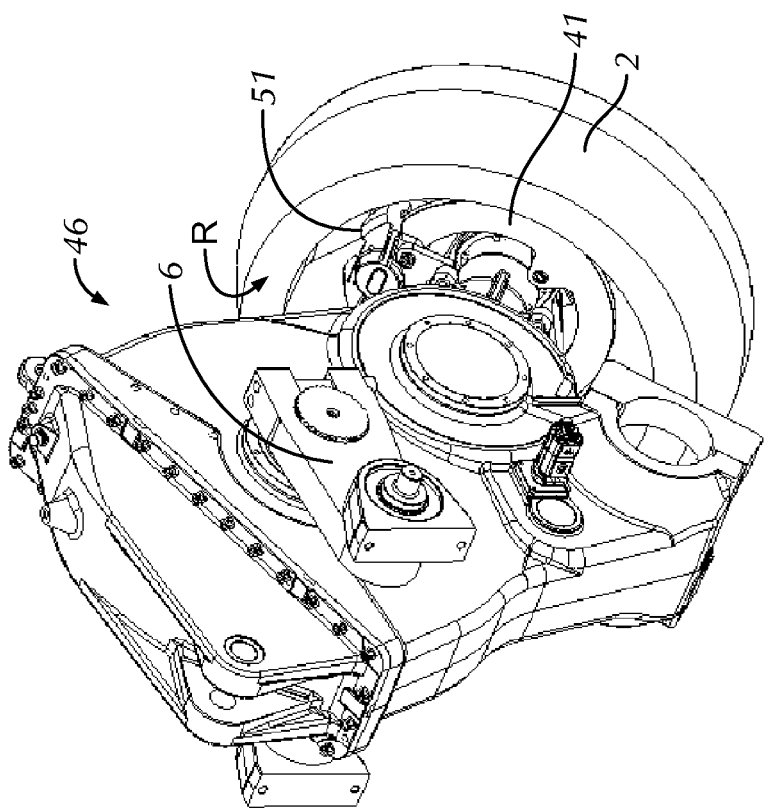
Figure 9:
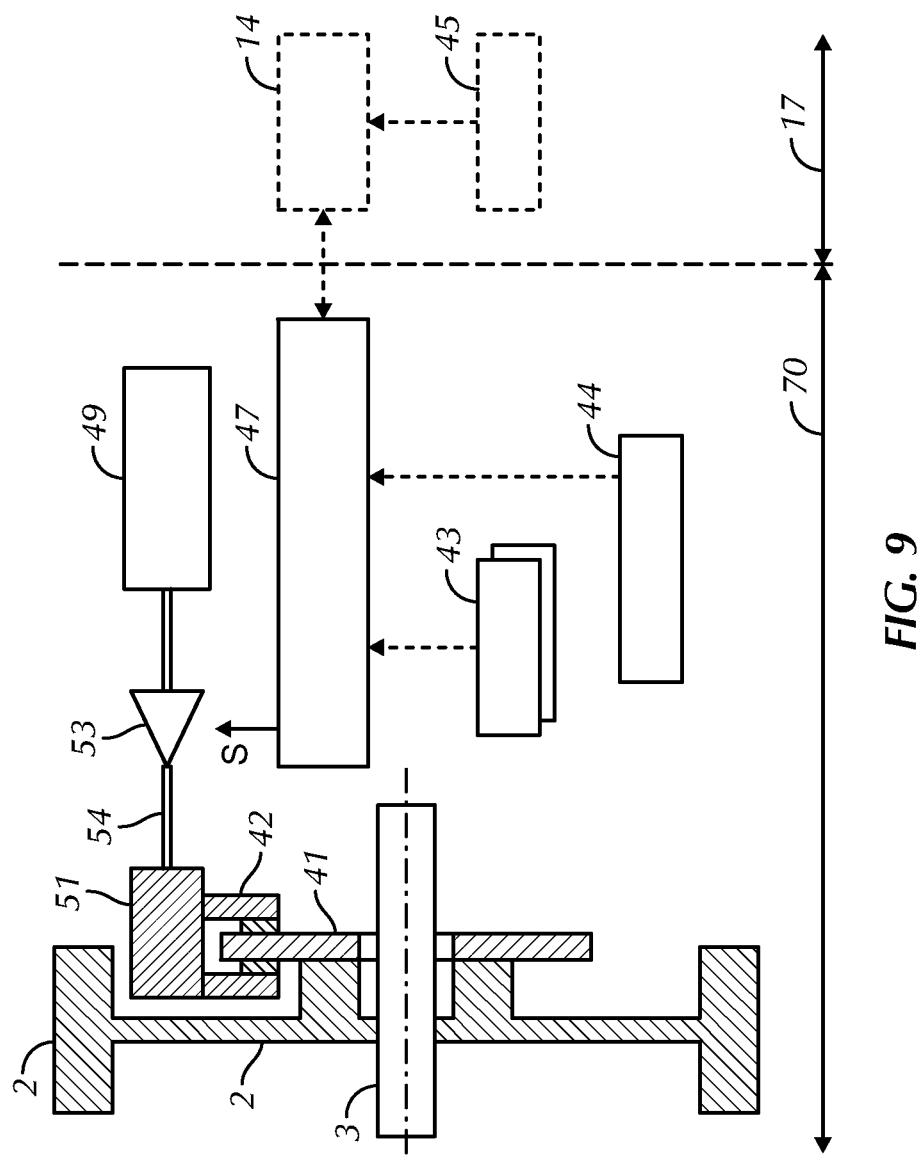
FIG. 9 is a schematic drawing of a system comprising a tractor (right) and a baler (left), the baler comprising a brake controller for stopping the flywheel in a controlled manner according to an embodiment of the present invention.

Flywheel Disk Brake Arrangement:

An example of a flywheel and disc brake arrangement is schematically illustrated in FIG. 5 and FIG. 6. The disc brake system 40 shown in FIG. 5 is a caliper-type disc brake. It comprises a brake disc 41 and a caliper 51 comprising two disc claws 42, each claw having a brake pad 58 for contacting a side of the brake disc 41. Disc brake systems 40 are well known in the art, and therefore need not be further described here. Also other kinds of disc brakes may be used, e.g. a drum-type disc brake. It is noted that FIG. 5 and FIG. 6 are only schematic drawings, they are not drawn to the scale, but only illustrate the principles of the invention. FIG. 7 and FIG. 8 show 3D-CAD drawings of an example of a gearbox assembly comprising a gearbox 46, a flywheel 2, a brake disc 41 mounted to the flywheel 2, and a brake caliper 51 mounted to the gearbox 46, and arranged for engaging with the brake disc 41. Caliper-type disc brake systems 40 have the advantage that the braking can be better controlled, because the braking force is proportional to the pressure placed on the brake pad 58 by the braking system, e.g. by a brake servo. FIG. 9 is a schematic drawing of a baler 70 comprising the flywheel and disc brake arrangement of FIG. 5, and a brake controller 47. A command for braking may be given by a local input device 44, or optionally by a remote input device 45 connected to a tractor controller 14, which is connectable to the brake controller 47. The brake caliper 51 in the example of FIG. 9 is a hydraulic caliper fluidly coupled to the hydraulic system 49 of the baler 70 via hydraulic lines 54 and a control valve 53. The brake caliper 51, may comprise two or more pistons, also called 'pots'. The braking force is adjustable via the control valve 53, which is controlled by the brake controller 47, which may be part of an integrated baler controller (not shown). The brake controller 47 may e.g. be an electronic controller adapted for activating or deactivating the brake caliper 51 with a predetermined braking force, which may be a constant or a variable force. Also connected to the brake controller 47 is at least one sensor 43 for determining a parameter of the baler 70, such as e.g. angular velocity of the crank 6, the angular velocity of the flywheel 2, the angular position of the crank 6, the angular position of the flywheel 2, the position of the plunger 13, the speed of the plunger 13. The at least one sensor 43 may also be a proximity sensor, e.g. a magnetic or inductive or IR sensor for sensing when the crank 6 or plunger 13 passes a predetermined position.

Mathematical Model:

The kinetic behavior of the baler 70 during switch-off can be described by means of mathematical formulas, which may be used by the brake controller 47 for predicting the behavior of the baler 70, in order to determine a suitable braking force and/or a suitable time for starting to brake such that the baler 70 comes to a stop in the predetermined launch position range. When the baler 70 is decoupled from the tractor PTO 15, and is running freely, no energy is injected into the baler 70, and the following formula, expressing conservation of energy, is applicable to the baler 70 while slowing down:

$$E\text{kin}+E\text{compr}+E\text{friction}+E\text{brake}=\text{constant} \quad (1)$$

When No Braking is Applied.

Figure 10:
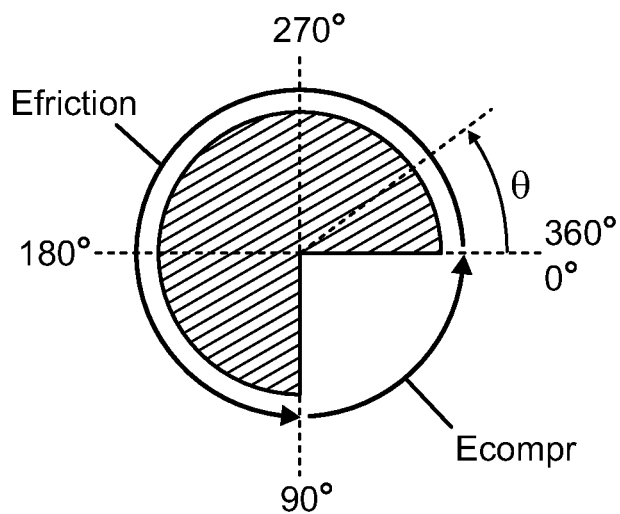
FIG. 10 shows a schematic representation of the movement of the crank, with an indication of a friction zone and a compression zone, according to a mathematical model of the baler as can be used in embodiments of the present invention.

Consider first the case where no braking is applied, thus assume Ebrake=0. As shown in FIG. 10, in each rotation of the crank 6, part of the kinetic energy Ekin initially present in the system (mainly in the flywheel 2) is converted into heat by the compression of the crop material 18 in the bale chamber 80, and another part by friction, indicated as Ecompr and Efriction respectively. By evaluating formula (1) at two instances of time, wherein the crank 6 has made one full rotation, and assuming that compression occurs in a first angular range (e.g. from 90° to 0°), and assuming that friction occurs in a second angular range (e.g. from 360° to 90°), then formula (1) becomes:

$$\Delta E\text{kin}=E\text{compr}+E\text{friction} \quad (2)$$

This formula can be split into two parts:

$$\Delta E\text{kin1}=E\text{compr} \quad (3),$$

(for θ ranging from 90° to 0°)

$$\Delta E\text{kin2}=E\text{friction} \quad (4),$$

(for θ ranging from 360° to 90°)

By further assuming that the inertia of all moving parts (e.g. flywheel 2, gearbox 46, shaft 3, crank 6, plunger 13, etc) of the baler 70 are concentrated in a hypothetical flywheel, rotating at the same speed as the crank, we can write:

$$E\text{kin}(t)=k1\cdot\omega^2(t) \quad (5),$$

k1 is a constant for a particular baler 70, and can be determined experimentally, ω(t) is the angular velocity of the crank (and of the hypothetical flywheel), and is equal to the time derivative of the crank angle, ω(t)=dθ(t)/dt.

The mathematical model is further based on the assumption that the compression energy and friction energy over each cycle can be approximated by the following formulas:

$$E\text{compr}=k21+k22\cdot\omega(t0) \quad (6),$$

t0 being the time at the start of the compression, $$E\text{friction} = k31 + k32 \cdot \omega(t1) \quad (7),$$

t1 being the time at the end of the compression, k21 and k22 are coefficients related to the amount of, and compressibility of the crop material 18 in the bale chamber 80, these coefficients may vary continuously, but are assumed to vary only slowly, so that the coefficients of a previous rotation can be used for estimating the compression energy Ecompr for the next rotation. After each compression is performed, the coefficients can be updated for the next prediction.

k31 and k32 are coefficients related to the friction of the baler 70, these coefficients are assumed to have a very large time constant (e.g. weeks, months, years), depending on the wear of the baler 70.

Once these coefficients are known (e.g. determined experimentally), one can, by using these formulas, predict how much of the kinetic energy will be lost in the next crank rotation. More in particular, one can calculate if sufficient kinetic energy is left for "surviving" the next rotation.

When Braking is Applied.

When a braking force Fbrake(t) is applied to the flywheel 2 from time t1 until t2, the kinetic energy Ekin converted into heat due to the braking force, is equal to:

$$E\text{brake} = \int_{t1}^{t2} k4 \cdot F\text{brake}(t) \cdot \omega(t) \cdot dt \quad (8)$$

k4 is a constant related to the braking system, and can be determined experimentally.

Fbrake(t) is the braking force applied to the brake disc 41, which may be constant, or may vary over time.

As the formulas are rather abstract, two simplified examples will be described next, in order to gain more insight in the braking method.

a) Slightly Reducing the Speed Using a Constant Braking Force F1 During a Short Time Period:

If Fbrake(t) is a constant force F1, and is applied during a short period of time from t1 to t2, the speed w of the flywheel 2 is slightly reduced, without coming to a stop. Assume $\omega(t)$ can be approximated between t1 and t2 by an average angular velocity $\bar{\omega}$, then formula (8) becomes:

$$E\text{brake} = k4 \cdot F1 \cdot \bar{\omega} \cdot (t2-t1) \quad (9)$$

From formula (9) it can be seen that in this case the braking energy Ebrake is proportional to the braking force F1, and proportional to the braking time $\Delta t = t2-t1$, and proportional to the average angular velocity $\bar{\omega}$.

b) Stooping Using a Constant Braking Force F2:

If Fbrake(t) is a constant force F2, applied to the disc brake system 40 until the flywheel 2 has come to a stop, and assuming the friction energy Efrict is negligible w.r.t. the braking energy Ebrake, and assuming that no compression occurs during braking (e.g. by activating the brake only in the angular range from about 360° to about 90°), then $\omega(t)$ can be approximated by:

$$\omega(t) = (\omega 0 - \alpha \cdot t) \quad (10a),$$

$\omega 0$ being the angular velocity just before braking, $$\alpha = \omega 0/\Delta t \quad (10b),$$

$\alpha$ being a constant deceleration, $\Delta t$ the time required.

Filling this expression in formula (8), and using (10b), yields:

$$E\text{brake} = k4 \cdot F2 \cdot [\omega 0 \cdot (t2-t1) - \alpha \cdot (t2-t1)2/2],$$

$$E\text{brake} = k4 \cdot F2 \cdot \omega 0 \cdot [\Delta t - \Delta t/2], \text{ or}$$

$$E\text{brake} = k4 \cdot F2 \cdot \omega 0 \cdot \Delta t/2 \quad (11)$$

Since in this case the total kinetic energy Ekin of the flywheel 2 will be converted into heat by the brake, Ebrake is also equal to the kinetic energy before starting braking, thus:

$$E\text{brake} = k1 \cdot \omega 02 \quad (12),$$

This formula shows that the brake energy is independent of $\Delta t$, and thus is the same for a strong short brake, or for a long soft brake.

By equating (11) to (12), one obtains:

$$k4 \cdot F2 \cdot \omega 0 \cdot \Delta t/2 = k1 \cdot \omega 02 \quad (13),$$

or:

$$F2 \cdot \Delta t = (2 \cdot k1/k4) \cdot \omega 0 \quad (14)$$

From equation (14), one can see that for a constant force F2, the braking time $\Delta t$ is proportional to the initial angular velocity $\omega 0$ just before braking. Thus, in order to keep the braking time $\Delta t$ small, it is beneficial to start braking from a small, e.g. the lowest possible $\omega 0$.

One can further see that, for a given speed $\omega 0$, the braking time $\Delta t$ can be reduced by choosing a larger F2, since it follows from (14) that:

$$\Delta t = (2 \cdot k1/k4) \cdot \omega 0/F2 \quad (15),$$

which $\Delta t$ can be made as small as desired by choosing a sufficiently large braking force F2.

During this time period $\Delta t$, the crank 6 will rotate over an angle equal to the integral given by formula (10), i.e. the braking angle $\theta\text{brake} = \omega 0 \cdot (\Delta t/2)$, which combined with formula (15) yields:

$$\theta\text{brake} = \omega 0 \cdot (k1/k4) \cdot \omega 0/F2, \text{ or}$$

$$\theta\text{brake} = (\omega 02 \cdot k1)/(k4 \cdot F2) \quad (16)$$

From formula (16) it can be seen that, for any initial velocity $\omega 0$, a force F2 can be chosen such that the braking angle $\theta\text{brake}$ can be as small as desired. This proves that it is possible to make the crank 6 stop in any desired position, thus also in a predefined launch position range. For example, in an embodiment of the invention, the braking is started immediately after the compression, i.e. when the crank 6 is in angular position 360°, corresponding to the plunger 13 being in its distal position 8, but the invention is not limited thereto, and other crank positions for starting the brake may also be chosen, e.g. 350°, 340°, etc, but also before the plunger 13 has reached its distal position, e.g. 10°, 20°, etc.

Figure 11:
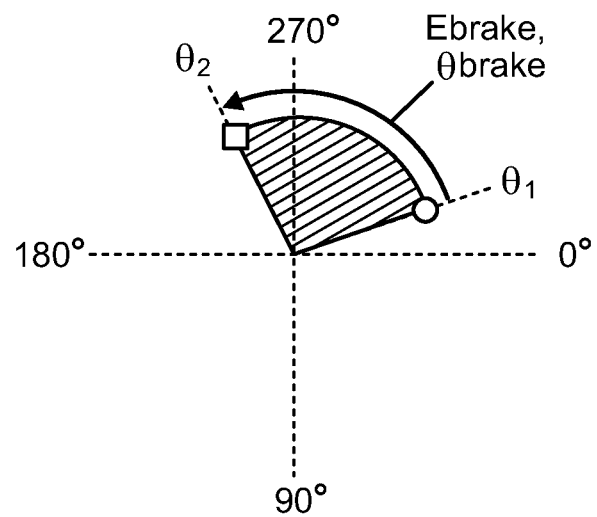
FIG. 11 shows a schematic representation of the movement of the crank during active braking of the flywheel, from angular position $\theta 1$ to angular position $\theta 2$.

FIG. 11 shows an example where F2 and $\omega 0$ are chosen such that $\theta\text{brake} = 90°$ (see formula 16), and wherein braking is started when the crank 6 is in angular position $\theta 1 = 340°$, so that the crank 6 will come to a stop at $\theta 2 = 250°$, which is also the crank position for the next baler start-up. This is only an example, and other values may be chosen.

In the above description, a constant braking force F1 and F2 was used to further work-out the formulas such that they can be readily understood, but it is not absolutely necessary that the braking force Fbrake is a constant force. Thus in practice, the braking force Fbrake may vary over time, e.g. in a step-wise manner (by choosing between two or more constant forces), or in a piece-wise linear manner, or according to a more complex function (e.g. a non-linear ramping function).

Also note that, in the description above, the braking action does not coincide with a compression action, to simplify the formulas, but also that is not absolutely required. Thus in practice, a braking action may occur also during compression. Several embodiments will now be described in more detail, and illustrated by the drawings.

Example 1

Figure 13:
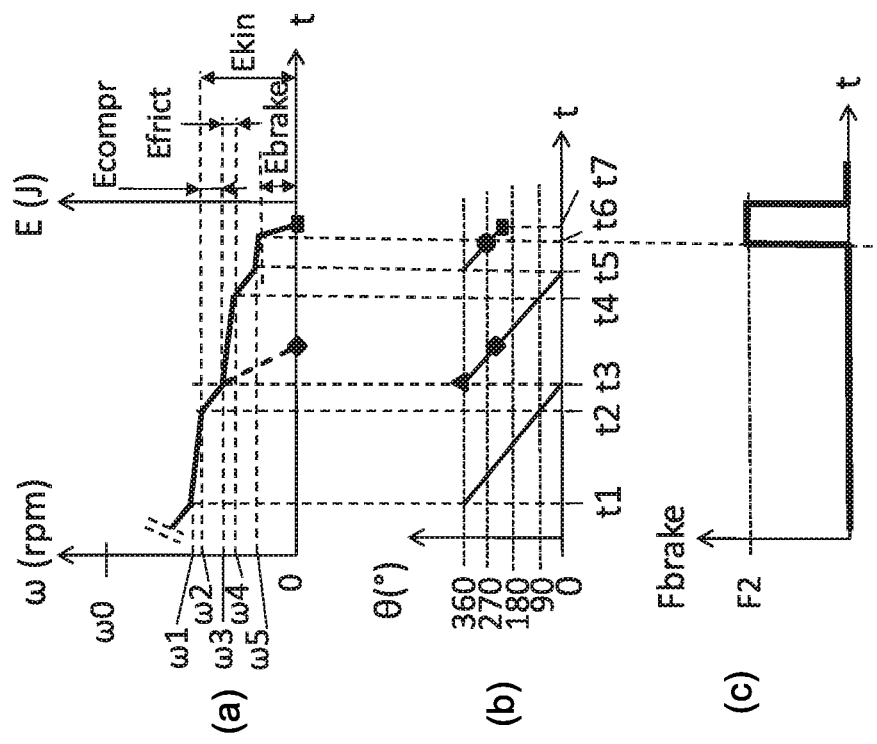
FIG. 13 shows part of FIG. 12 in enlarged view.
Figure 12:
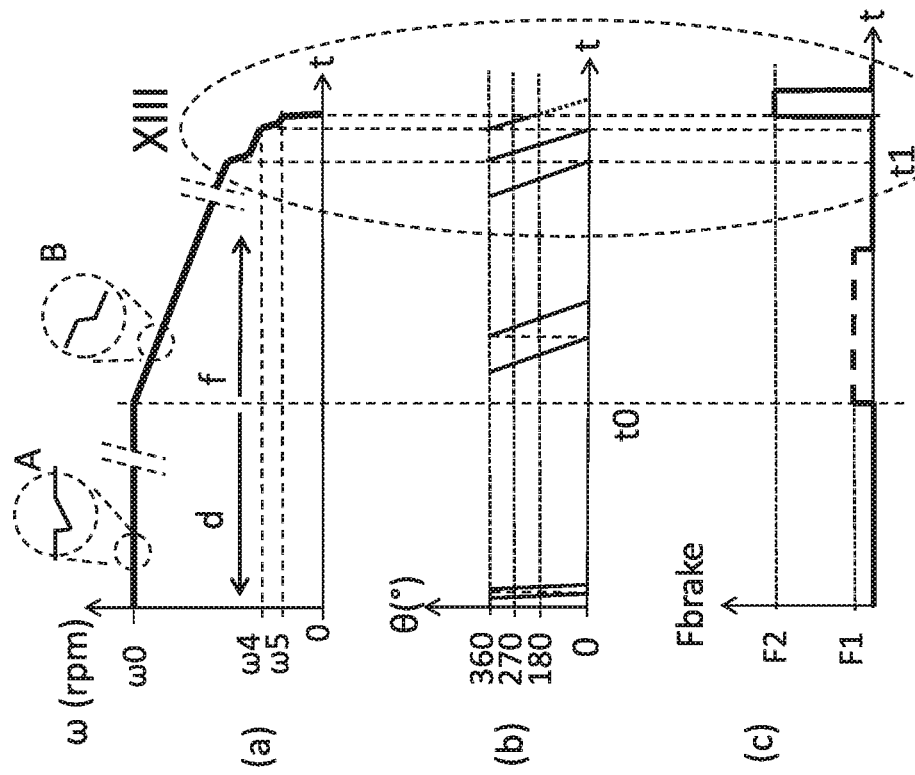
FIG. 12 shows an example of a controlled braking action for a baler with a position sensor and a velocity sensor according to an embodiment of the present invention.

In a first example, the baler 70 comprises a first sensor 43a (see FIG. 9) for measuring the angular velocity ω as a function of time: ω(t), e.g. a tachometer or a speed sensor, and a second sensor 43b for measuring the angular displacement of the crank as a function of time: θ(t). The first and second sensor 43a, 43b need not be located on the crank 6 itself, but may also be located e.g. on the flywheel 2, or on the shaft 3, running synchronously with the crank 6. In that case, the sensor signals, e.g. the angular position θ or angular velocity ω of the shaft 3 can easily be converted into the angular position and angular velocity of the crank 6 by applying a multiplication factor N, being the ratio of the rotation speed of the shaft 3 and that of the crank 6. FIG. 12 and FIG. 13 show a graph of the angular velocity ω(t) and angular position θ(t) of the crank versus time.

The sensors 43 in this example provide a continuous time signal ω(t) and θ(t). Before time t0, the baler 70 is actively driven for producing bales, and the crank rotational speed is substantially constant, and equal to ω0, for example about 43 rpm (corresponding to 1000 rpm of the flywheel 2), see FIG. 12(*a*).

In reality the crank angular speed is not really constant, but periodically decreases e.g. with 2.5 rpm (corresponding to a drop of about 60 rpm for the flywheel 2) during each compression of the crop material 18 in the bale chamber 80 (e.g. when the crank 6 is between 90° and 0°), and is increased again by the tractor PTO (e.g. when the crank is between 360° and 90°), as indicated in detail A of FIG. 12(*a*).

When the baler 70 is switched off at time t0 (FIG. 12), e.g. by decoupling the tractor PTO, the moving parts of the baler 70 (e.g. the flywheel 2, gearbox 46, shaft 3, crank 6, plunger 13, etc) start to slow down, but the crank 6 will still perform several revolutions, and the plunger 13 will still perform several compressions before the baler 70 has come to a full stop. During each compression of the crop material 18, a drop in angular velocity Δω can be seen. The velocity drop Δω typically increases as the velocity w itself decreases. Between these velocity drops due to compressions, the angular velocity also gradually decreases, e.g. due to friction, as shown in detail B of FIG. 12(*a*), where the drop due to compression is rather steep. After a while, the angular velocity of the crank 6 will be decreased to ω1 at time t1, see FIG. 13.

FIG. 13 shows an enlarged portion of the right part of FIG. 12. Consider one full rotation of the crank between t1 and t3, whereby θ goes from 360° to 90° and then further to 0°, and wherein the corresponding speed drops from ω1 to ω2 due to friction, and from ω2 to ω3 due to compression. The friction energy Efrict lost between t1 and t2 can be calculated from formulas (4) and (5) as: Efrict,t1–t2=k1·(ω12−ω22), and the friction energy between t3 and t4 can be calculated in a similar manner as: Efrict,t3–t4=k1·(ω32−ω42). By fitting the formula (6) to these calculated values, the coefficients k31 and k32 can then be calculated, and may be updated each period (i.e. each crank revolution). Alternatively these coefficients may be predefined constants which can be retrieved from a non-volatile memory, e.g. flash, and are not updated. In an embodiment, k32 may be assumed equal to zero.

In a similar manner the energy required for compressing the crop material 18 in the period t2-t3 can be calculated from formulas (3) and (5) as: Ecompr,t2–t3=k1·(ω22−ω32), and the compression energy between t4 and t5 can be calculated as: Ecompr,t4–t5=k1·(ω42−ω52), etc. By fitting the formula (4) to the measured values, the coefficients k21 and k22 can be calculated and optionally updated each period. In practice these coefficients will not vary significantly for consecutive revolutions, (e.g. because only a small amount of crop is added in the bale chamber), or in other words, the compression energy of a previous revolution is a good estimate of the compression energy required for a next revolution, which can be used to predict the corresponding loss in angular velocity for the next period (i.e. crank rotation).

Now, in order to stop the crank 6 in the predefined launch position range, e.g. in the range of 270° to 360°, the brake controller 47 performs an algorithm that checks at least once for each revolution whether the baler 70 still has sufficient kinetic energy for "surviving" the next revolution. The critical moment is where the kinetic energy Ekin of the baler 70 becomes equal to or lower than the sum of the friction energy Efrict and the compression energy Ecompr required for the next revolution. If the baler 70 is not deliberately stopped, then the baler 70 will stall during the next revolution, herein called the "critical revolution". The algorithm avoids this situation by braking while the kinetic energy is still sufficient, and while it is still possible to stop in the predefined launch position. For example, the brake controller 47 may monitor the velocity while the baler 70 is running freely, until the one but last revolution, preceding the "critical revolution", and then apply the brake, e.g. when the crank 6 is beyond the 360° position. However, if the braking force can be accurately controlled (in amplitude and/or time), it is possible to start braking at other crank angles, using an appropriate braking force.

In an example, the braking force is constant and equal to F2, and is only started when the crank 6 has reached a predetermined angular position, e.g. 270°, indicated by the black circle in FIG. 13(*b*). While decelerating, the crank will rotate slightly further during a time period Δt, depending on the velocity just before braking, (in this case slightly less than ω5) and depending on the force F2. In this example the force F2 is chosen large enough for the baler 70 to come to a stop in an angular position of about 200°, as indicated by the black square in FIG. 13(*b*).

Note that activating the brake when the crank is at 270° is just an example, (chosen for illustrative purposes, so that t6 does not coincide with t5), but other angles for starting the brake, e.g. 280°, 290°, 300°, 310°, 320°, 330°, 340°, or even higher may also be used, taking into account the angle θbrake required during braking before coming to a full stop. In the example of FIG. 11, where F2 and ω0 are such that θbrake=90°, it would mean that, when starting to brake at crank angle 340°, the crank would come to a stop at 340°−90°=250°.

Alternatively it may even be better to start braking sooner than 340°, e.g. at an angle of 30°, thus partly simultaneous with the compression. Assuming the same θbrake=90°, it would imply that the crank would stop at 30°−90°+360°=300°.

In yet another alternative, the brake controller 47 may also decide to stop the baler 70 at the second revolution preceding the "critical revolution". In that case more heat will be dissipated by the brake system (see formula 12), and unless the braking force is increased, a larger braking angle θbrake will be required. An example is illustrated in FIG. 13(b), where θbrake=120°, and where the braking is started at crank position 360° (indicated by the black triangle), and where the crank 6 comes to a stop at 360°-120°=240° (indicated by the black diamond). The corresponding drop in the angular speed is shown in FIG. 13(a) in dashed line.

Note that the braking force Fbrake in the example of FIG. 13(c) is assumed zero (i.e. no braking is applied) until time instance t6, but that is not absolutely required. Instead of letting the baler 70 run freely from its initial velocity at time t0 until the kinetic energy of the baler 70 has (almost) reached its critical value equal to (Efrict+Ecompr) as explained above, it is allowed to apply a braking force F1 (or F2) earlier, e.g. before time instance t1, as indicated in FIG. 12(c) in dashed line. However, this optional additional braking action should not slow down the baler 70 too much, i.e. the kinetic energy should remain above the critical value. The person skilled in the art can choose a suitable braking force F1 and/or a suitable braking period to avoid this situation, for example, by applying a constant force F1 while monitoring the angular velocity, and releasing the braking force when the angular velocity has reached a certain value well above the critical value ωthr (treshold velocity) for surviving the last rotation.

Example 2

In a variant of example 1, instead of calculating Efrict and Ecompr of the previous revolution, and predicting Efrict and Ecompr for the next revolution, and checking if the kinetic energy is still large enough for surviving the next revolution, the algorithm may compare the kinetic energy to a predefined threshold energy Ethr instead. The value of this threshold energy may be determined during testing or calibration of a particular baler 70, e.g. under worst case crop conditions, optionally by taking into account a safety margin. Note that according to formula (5), checking if the kinetic energy Ekin is equal to or smaller than a predefined threshold value Ethr, is equivalent to checking if the angular speed w is equal to or smaller than a predefined threshold value ωthr. Note that this value of Ethr may also be calculated from formulas (6) and (7), taking into account realistic values for k21, k22, k31, k32 and ω at which the braking is started. The algorithm of example 2 would let the baler 70 gradually slow down until the angular velocity ω(t) has reached the threshold speed ωthr, and would then wait until the crank is in a predefined angular position for starting the brake, e.g. 270° for the black circle of FIG. 13(b), and would then apply the brake with the predefined force. As for example 1, start angles may also be used, e.g. 300°, 330°, 360°, 30°, 60°, taking into account the value for θbrake. The start-position in example 1 and 2 may be a fixed predetermined value, or may be determined by the algorithm, e.g. by using a look-up table, where a different start-angle may be chosen depending on the angular velocity. The values for the look-up table may be stored in a memory during design or calibration phase.

Example 3

Figure 14:
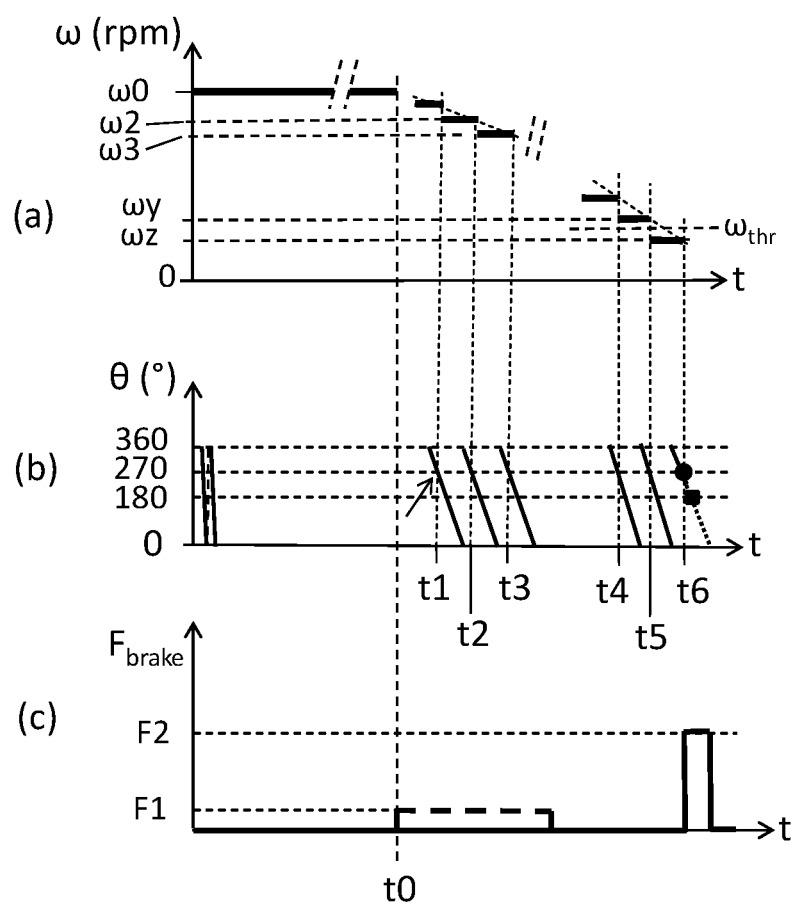
FIG. 14 shows an example of a controlled braking action for a baler with a proximity sensor according to an embodiment of the present invention.

In a third example, illustrated in FIG. 14, the baler 70 comprises a proximity sensor 43 located at crank angle 270°, which gives a signal when the crank passes the 270° angular position. The brake controller 47 comprises a processor connected to a clock unit and to a memory. When the crank 6 passes the sensor 43 a first time, the sensor 43 gives a signal, and the processor retrieves a first time value t1 from the clock unit, and stores the value in the memory. When the crank passes the sensor 43 the next time, a second time value t2 is retrieved from the clock unit, and also stored in memory. The difference in time is then calculated as:

$$\Delta t = t2 - t1$$

and the (average) angular velocity is calculated as:

$$\overline{\omega} = 2 * pi/\Delta t, \text{ where } pi \text{ is approximately } 3.1416$$

FIG. 14 gives a graphical representation of this data and the functioning of this algorithm. FIG. 14(a) shows a step-wise approximation of the angular velocity ω(t) of the crank over time, as obtained by this algorithm. Before time t1, the baler is actively driven, and the crank 6 is rotating at its nominal speed ω0. At time t0, the baler 70 is switched off, e.g. by decoupling the tractor PTO 15. The angular velocity of the crank 6 (and flywheel, and shaft, etc) will gradually slow down. As long as the angular velocity thus calculated is larger than a predetermined threshold value ωthr, which in FIG. 14 is the case at t1, t2, t3, . . . , t4, t5, no braking force is applied. However, when the angular velocity $\overline{\omega}$ thus calculated is equal to, or smaller than the predetermined threshold value ωthr, which in FIG. 14 occurs at t6, then a predetermined braking force F2 is applied to the braking system 40. In this example, wherein the proximity sensor is located at 270° crank position, the braking force F2 is applied as soon as possible after t6. The start of the braking action is indicated in FIG. 14(b) by a black circle. The braking force will slow down the moving parts of the baler 70, (a.o. the flywheel 2, the shaft 3, the gearbox 46, the crank 6, etc), which in the example of FIG. 14(b) come to a full stop at an angular crank position of 180°, indicated by a black square, although the sensor 43 would not be able to verify this position (as it is a proximity sensor which can only detect when the crank is near the position of 270° in this example), but it is guaranteed by design (by applying the braking force F2, immediately after the crank is in the 270° position, and knowing that the angular speed of the crank is below ωthr, the rotation will come to a guaranteed stop). It is clear that, the larger the braking force F2, and the smaller the inertia of the moving parts of the baler 70, the sooner the baler 70 will come to a full stop. The person skilled in the art can determine such a braking force F2 depending on the characteristics of the baler 70, e.g. by design, by routine testing, by calculation (see mathematical section above), or simply by trial and error.

The threshold value ωthr for the angular velocity of the crank is preferably as low as possible, e.g. about 4.3 rpm (corresponding to about 100 rpm for the flywheel 2), for keeping the brake energy Ebrake and the brake angle θbrake as small as possible, but must be large enough to prevent that the baler 70 would stall during compression of the crop material 18. In other words, the threshold value ωthr should be determined such that the baler 70 still has sufficient kinetic energy to "survive" the next full rotation, including friction and compression, as described for example 1 and 2. This value may be determined experimentally. A safety margin (e.g. 20% or 30% or more) may also be taken into account.

It is noted that checking if the angular velocity $\overline{\omega}$ is equal to or smaller than a predefined threshold value ωthr is equivalent to checking if the time difference Δt between consecutive signals from the sensor 43 is equal to or larger than a predefined threshold value Δtthr. Using this criterium, the brake controller 47 would not need to calculate the average angular velocity, but simply have to detect when the time difference between two consecutive pulses from the sensor 43 becomes larger than Δtthr. This may simplify the implementation.

In variants of the third example, the sensor 43 may be located at another crank position, e.g. between 270° and 360°, e.g. at 280° or 290° or 300° or 310° or 320° or 330° or 340° or 350°. In any of these positions, the braking force F2 may be activated as soon as possible after t6 (i.e. the moment when the crank passes the sensor provided the condition that the speed has dropped below the given threshold value is met), since the crank angle corresponds to a plunger position past its distal position 8 in the bale chamber.

Alternatively, the sensor 43 may also be located at an angle of e.g. 10° or 20° or 30° or maybe even more, provided care is taken to prevent that the plunger 13 stops before reaching its distal position 8. This may be achieved by applying a sufficiently small force F2 (at least initially), or by using a time delay between time t6 and applying the braking force. The time delay may be a predefined constant delay, or a time delay corresponding to the angular velocity, e.g. obtained via a look-up table, the values of which are determined during calibration phase. The time required for performing the above calculations may optionally be subtracted from the time delay.

In another variant, the sensor may e.g. be positioned at a position 330°-θbrake, θbrake being calculated by formula 16, using ωthr, and 330° being chosen for adding 30° safety margin. In this case, no time delay would be required, and the brake can be activated as soon as possible after the occurrence of the sensor signal, provided the condition that Δt>Δtthr is met.

Note that the braking force Fbrake in FIG. 14(c) was assumed to be zero until time instance t6, but that is not absolutely required. Instead of letting the baler 70 run freely from its initial velocity ω0 until it has (almost) reached the threshold value ωthr, it is allowed to apply a braking force F1 (or F2) before time instance t6, as indicated in FIG. 14(c) in dashed line. However, similar as in the other examples, this optional additional braking action should not slow down the baler 70 too much, i.e. so much that it would stall during compression. Again, this condition can be easily avoided by applying a first braking force F1 until the angular velocity ω has decreased below a predefined second threshold value ωthr2 (not shown) larger than ωthr. The person skilled in the art can easily choose a suitable braking force F1, and/or a suitable braking time, and a suitable second threshold value ωthr2.

Example 4

Figure 16:
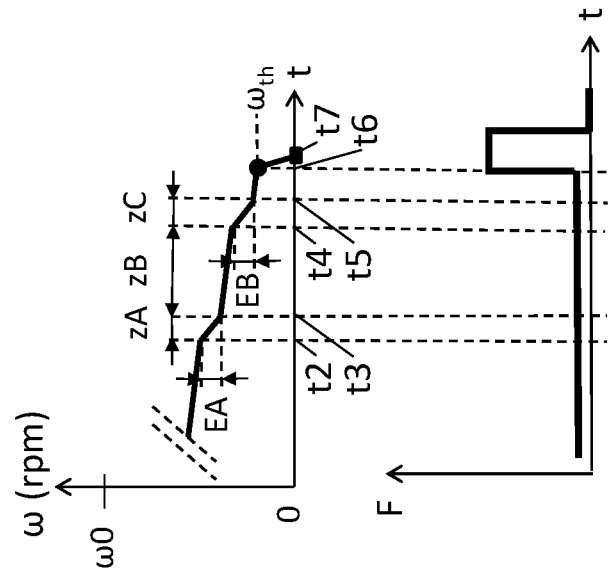
FIG. 16 shows part of FIG. 15 in enlarged view.
Figure 15:
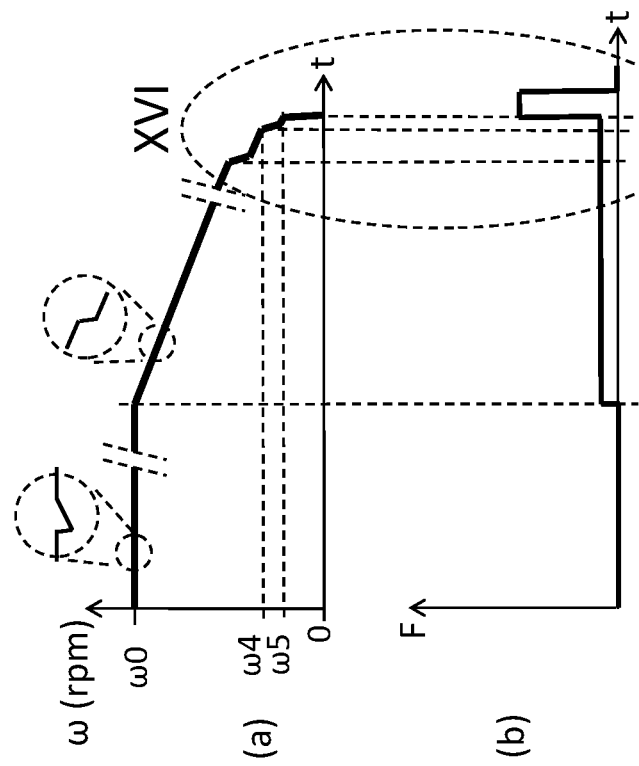
FIG. 15 shows an example of a controlled braking action for a baler with only a velocity sensor, according to an embodiment of the present invention.

This example is illustrated in FIGS. 15 and 16, and its functioning is quite similar to examples 1 and 2, except that the baler 70 would only have a speed sensor 43a, not a position sensor 43b. As before, if the sensor is mounted on the crank 6, it would directly provide the (continuous time) curve ω(t), if the sensor is mounted e.g. on the flywheel 2, the curve can be obtained by applying a multiplication factor N. In a first step, the algorithm would wait (and/or optionally apply a first braking force F1), until the kinetic energy Ekin reaches a threshold value Ethr (as in example 1), which is either a predefined constant, or is calculated in each period based on the difference in angular velocity, or until the angular velocity has reached a threshold value ωthr (as in example 2).

In a second step, the algorithm determines a suitable time for starting the braking action by applying the force Fbrake. But because of the lack of a position sensor, another mechanism is used for determining a suitable moment. The principle used in this example is detecting the compression zones zA, zC, etc, and the friction zones zB, etc by observing the angular velocity. Indeed, these zones can be easily detected because the slope of the angular velocity ω(t) in the compression zones is much higher than the slope of the angular velocity in the friction zones. This may e.g. be obtained by calculating the time derivative of the angular velocity. Since the compression always occurs at substantially the same angular crank position (see FIG. 10), the angular position of the crank can be derived from the angular velocity curve. Thus, in the second step the algorithm would wait until the compression zone is passed (i.e. after t5 in FIG. 16, as indicated by the black circle), and then activate the braking force, until the baler has come to a full stop (black square in FIG. 16).

In a variant of this example (not shown in FIG. 16), the algorithm may determine the time (t2-t3) and (t4-t5), etc for each compression zone, and may start braking slightly before the last compression zone is completely passed (i.e. slightly before t5). This corresponds to starting at a crank position of e.g. 30° or 60°, as described above.

Note that the algorithm of example 4 may also be used in a baler 70 having a speed sensor and a position sensor, as in example 1 and 2, if so desired, e.g. in case the position sensor would be malfunctioning.

It should be noted that in the rare case where the bale chamber 80 would be empty, which will probably only happen when a baler 70 is used for the very first time, at the beginning of a new harvesting season, after repair, etc, the algorithm of example 4 would not be able to detect a compression zone zA, zC, as there would be no crop material in the bale chamber 80. In such a case the algorithm may safely decide to stop the crank 6 in any angular position, since there will be no start-up problem for an empty baler 70.

Example 5

In a fifth example, the baler 70 has a relative position sensor, not a speed sensor. In such a case a speed curve ω(t) can be easily derived from the angular position signal, by determining the time derivative of the relative position. The same algorithm as in example 4 may be used.

Example 6

In a sixth example, the baler 70 has an absolute position sensor, not a speed sensor. In such a case a speed curve ω(t) can be derived from the angular position signal, by determining its time derivative, providing the same curves of ω(t) and θ(t) as in example 1, thus the same algorithm could be used as in example 1. Alternatively, the same algorithm as described in example 4 may also be used.

In the examples above, it is assumed that the braking angle (brake according to formula 16 is less than one full rotation, in which case no upper limit is imposed on the braking force, only a lower limit. But this is not absolutely required, and the final braking action, for bringing the flywheel to a stop may also last longer than one full rotation. In this case, in order to guarantee that the crank 6 stops in the predefined launch position range, the braking force Fbrake needs to lie between a lower and an upper limit, or the braking force may not be continuously applied, but be interrupted, or both.

Figure 17:
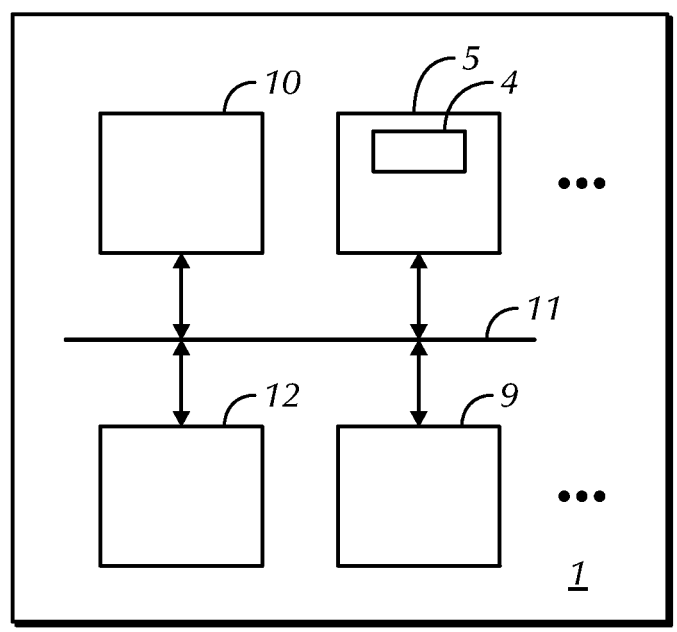
FIG. 17 shows a processing system including the instructions to implement aspects of the methods according to embodiments of the present invention.

The above-described method embodiments of the present invention may be implemented in a processing system 1 such as shown in FIG. 17. FIG. 17 shows one configuration of processing system 1 that includes at least one programmable processor 10 coupled to a memory subsystem 5 that includes at least one form of memory, e.g., RAM, ROM, and so forth. It is to be noted that the processor 10 or processors may be a general purpose, or a special purpose processor, and may be for inclusion in a device, e.g., a chip that has other components that perform other functions. Thus, one or more aspects of the present invention can be implemented in digital electronic circuitry, or in computer hardware, firmware, software, or in combinations of them. The processing system 1 may include a storage subsystem 12 that has at least one input port (e.g. disk drive and/or CD-ROM drive and/or DVD drive). In some implementations, a display system, a keyboard, and a pointing device may be included as part of a user interface subsystem 9 to provide for a user to manually input information. Ports for outputting data also may be included. More elements such as network connections, interfaces to various devices, and so forth, may be included, but are not illustrated in FIG. 17. The various elements of the processing system 1 may be coupled in various ways, including via a bus subsystem 11 shown in FIG. 17 for simplicity as a single bus, but will be understood to those in the art to include a system of at least one bus. The memory of the memory subsystem 5 may at some time hold part or all (in either case shown as 4) of a set of instructions that when executed on the processing system 1 implement the steps of the method embodiments described herein. Thus, while a processing system 1 such as shown in FIG. 17 is prior art, a system that includes the instructions to implement aspects of the methods for stopping a crank 6 of an agricultural baler 70 in a predefined position range is not prior art, and therefore FIG. 17 is not labelled as prior art.

The present invention also includes a computer program or computer program product which provides the functionality of any of the methods according to the present invention when executed on a computing device. Such computer program product can be tangibly embodied in a carrier medium carrying machine-readable code for execution by a programmable processor. The present invention thus also relates to a carrier medium carrying a computer program product that, when executed on computing means, provides instructions for executing any of the methods as described above. The term "carrier medium" refers to any medium that participates in providing instructions to a processor for execution. Such a medium may take many forms, including but not limited to, non-volatile media, and transmission media. Non volatile media include, for example, optical or magnetic disks, such as a storage device which is part of mass storage. Common forms of computer readable media include, a CD-ROM, a DVD, a flexible disk or floppy disk, a memory key, a tape, a memory chip or cartridge or any other medium from which a computer can read. Various forms of computer readable media may be involved in carrying one or more sequences of one or more instructions to a processor for execution. The computer program or computer program product can be carried on an electrical carrier signal. The computer program product can also be transmitted via a carrier wave in a network, such as a LAN, a WAN or the Internet. Transmission media can take the form of acoustic or light waves, such as those generated during radio wave and infrared data communications. Transmission media include coaxial cables, copper wire and fibre optics, including the wires that comprise a bus within a computer.

The invention claimed is:

1. An agricultural baler, comprising:
a shaft for coupling with a power take-off, and a flywheel connected to the shaft;
a plunger connected to the flywheel via a crank, the plunger being adapted for performing a reciprocal movement between a near position allowing crop material to be added in a bale chamber and a distal position suitable for compressing crop material in the bale chamber;
a brake system adapted for providing a physical brake force for decelerating the flywheel depending on a brake control signal;
at least one sensor for providing sensor data indicative for at least one moving part of the baler;
a brake control system connected to the at least one sensor for receiving the sensor data, and connected to the brake system for providing the brake control signal, the brake control system comprising a processing system;
wherein the power take-off is driven by an external power source; and
wherein upon decoupling the shaft from the power take-off, the processing system is configured to: (i) receive the sensor data from the at least one sensor; and (ii) when the sensor data is indicative of a predetermined value associated with the at least one moving part of the baler, regulate the brake system to apply the physical brake force via a caliper to a brake disk mounted to the flywheel to decelerate and stop the flywheel and crank in a predefined launch position range.

2. The agricultural baler according to claim 1, wherein the predefined launch position range is a range of angular positions of the crank situated at an angular distance ranging from at least 90° to 180° in forward direction from the position of the crank where the plunger reaches its distal position.

3. The agricultural baler according to claim 1, wherein the processing system is configured to determine a start time for applying the physical brake force based on the sensor data.

4. The agricultural baler according to claim 3, wherein the sensor data is indicative of the crank velocity and the crank position, and wherein the processing system is configured to determine as the start time the time when the angular velocity has decreased below a threshold velocity, and wherein the crank position has reached a threshold angle.

5. The agricultural baler according to claim 4, wherein the at least one sensor comprises a proximity sensor located at the threshold angle, and wherein the processing system is connected to a clock unit; and wherein the processing system is configured to convert the sensor data into an angular velocity.

6. The agricultural baler according to claim 4, wherein the at least one sensor comprises an absolute position sensor adapted for providing data indicative of the angular position of the crank, and wherein the processing system is configured to convert the sensor data into an angular velocity.

7. The agricultural baler according to claim 4, wherein the at least one sensor comprises a relative position sensor adapted for providing data indicative for the relative angular position of the crank, and wherein the processing system is configured to convert the sensor data into an angular velocity, and wherein the processing system is configured to determine a compression zone, and for assigning a time corresponding to an end of the compression zone to the start time.

8. The agricultural baler according to claim 4, wherein the at least one sensor comprises a velocity sensor adapted for providing data indicative of the angular velocity of the crank, and wherein the processing system is configured to determine a compression zone, and for assigning a time corresponding to an end of the compression zone to the start time.

9. The agricultural baler according to claim 1, wherein the at least one sensor comprises a velocity sensor adapted for providing data indicative of the angular velocity of the flywheel.

10. The agricultural baler according to claim 1, wherein the predefined launch position range is a range of angular positions of the crank situated at an angular distance of at least 90° to 360° in forward direction from the position of the crank where the plunger reaches its distal position.

11. A method for stopping a crank of an agricultural baler in a predefined launch position range, the baler comprising a shaft for coupling with a power take-off, and a flywheel connected to the shaft; a plunger connected to the flywheel via a crank, the plunger being adapted for performing a reciprocal movement between a near position in which crop material may be added in a bale chamber and a distal position in which the added crop material is compressed in the bale chamber; and a brake system adapted for providing a physical brake force for decelerating the flywheel depending on a brake control signal, the method comprising:
    providing sensor data from at least one sensor indicative of at least one moving part of the baler;
    decoupling the shaft from the power take-off;
    receiving the sensor data with a brake control system connected to the at least one sensor and the brake control system connected to the brake system for providing the brake control signal, the brake control system comprising a processing system;
    determining a start time using the processing system based on when the sensor data is indicative of a predetermined value associated with the at least one moving part of the baler; and
    applying the physical brake force via a caliper to a brake disk mounted to the flywheel using the brake control system at the determined start time to decelerate and stop the flywheel and crank in a predefined launch position range.

12. The method according to claim 11, wherein the sensor data is indicative of the crank velocity and the crank position, and wherein step of determining the start time comprises determining as the start time the time when the angular velocity has decreased below a threshold velocity, and wherein the crank position is in or has passed a threshold angle.

13. The method according to claim 12,
    wherein the at least one sensor comprises a proximity sensor located at the threshold angle, and wherein the processing system is connected to a clock unit; and
    wherein the step of determining the start time comprises the steps of:
        retrieving a time value from the clock unit; and
        converting the sensor data into angular velocity.

14. The method according to claim 12,
    wherein the at least one sensor comprises an absolute position sensor adapted for providing data indicative for the angular position of the crank, and
    wherein the step of determining the start time comprises the step of:
        converting the sensor data into angular velocity data.

15. The method according to claim 12, wherein the at least one sensor comprises a relative position sensor adapted for providing data indicative for the relative angular position of the crank, and wherein the step of determining the start time comprises the steps of:
    converting the sensor data into angular velocity data,
    determining a compression zone in the angular velocity data;
    assigning a time corresponding to an end of the compression zone to the start time.

16. The method according to claim 12, wherein the at least one sensor comprises a velocity sensor adapted for providing data indicative for the angular velocity of the crank, and
    wherein the step of determining the start time comprises the steps of:
        determining a compression zone in the angular velocity data; and
        assigning a time corresponding to an end of the compression zone to the start time.

* * * * *